April 25, 1961   R. SOMMER ET AL   2,981,163
PHOTOGRAPHIC CAMERA PROVIDED WITH A SHUTTER AND DIAPHRAGM
Filed July 8, 1958

INVENTORS
RICHARD SOMMER AND PAUL GREGER
BY
Macky Blum
ATTORNEYS

April 25, 1961   R. SOMMER ET AL   2,981,163
PHOTOGRAPHIC CAMERA PROVIDED WITH A SHUTTER AND DIAPHRAGM
Filed July 8, 1958   3 Sheets—Sheet 3

INVENTORS
RICHARD SOMMER and PAUL GREGER
BY
Macker Blum
ATTORNEYS

United States Patent Office 2,981,163
Patented Apr. 25, 1961

2,981,163

PHOTOGRAPHIC CAMERA PROVIDED WITH A SHUTTER AND DIAPHRAGM

Richard Sommer and Paul Greger, Braunschweig, Germany, assignors to Voigtlander A.G., Braunschweig, Germany, a corporation of Germany Filed July 8, 1958, Ser. No. 747,298

Claims priority, application Germany July 10, 1957

3 Claims. (Cl. 95—10)

This invention relates to photographic cameras having a shutter and a diaphragm and it has particular relation to cameras of this type, in which the diaphragm is adjustable by means of two diaphragm adjusters, the first of which is coupled with the shutter time adjusting member in the meaning of exposure value adjustment, while the second adjuster is freely adjustable by hand.

This construction permits adjustment in a simple manner of an exposure value and subsequent selection of a shutter time value and diaphragm value combination which corresponds to the exposure value. The first adjuster is adjustable relative to a scale of exposure values, so that upon adjustment of an exposure value, the diaphragm is adjusted to a value, which—together with the adjusted shutter time value—yields a combination corresponding to said exposure value. If then subsequently the shutter time adjusting member is adjusted to a value corresponding to the picture taking conditions, due to the coupling with the other diaphragm adjuster, the diaphragm will be adjusted in conformity with the correct exposure value. Thus, the diaphragm value changes upon displacement of the handle connected with the free diaphragm adjuster, as well as upon displacement of the shutter time adjusting handle.

It has been suggested to arrange a construction of above described type in the casing of a central shutter. Thereby it was necessary to carry out the selection of a correct exposure value on the basis of experience, or by using certain tables, or by means of a separate exposure meter. It will be appreciated that in transmitting to the adjusting device the values of said tables, or the values indicated by the exposure meter, errors may easily occur.

In order to simplify adjustment according to the present invention in a camera of the above described type, the free diaphragm adjuster is coupled with a mechanism which is arranged in the interior of the objective mount and the camera body, and by means of which a follow up mark can be adjusted to the deflection of an electric exposure meter built-in in the camera.

According to the preferred embodiment, the connection between the part arranged in the objective mount and the part located in the camera body of the follow up mark mechanism, is brought about by a member extending in the interior of the objective, in the direction of the optical axis.

As a control member for the follow up mark mechanism it is preferred to use a cam ring connected with the free diaphragm adjuster, whereby movement of said cam ring brings about displacement of the follow up mark mechanism. This cam ring carries a control cam, which preferably extends in the direction of the optical axis. According to an advantageous embodiment of the invention, this cam ring is connected, through an adjustable coupling member, with a setting ring which is connected by a releasable coupling with a diaphragm adjusting ring. The latter is connected by means of an adjustable coupling with a diaphragm control ring which is coupled with the free diaphragm adjuster.

Thus, as already mentioned above, in this adjusting device, by means of one of the diaphragm adjusters, adjustment of the exposure value is brought about, whereby the diaphragm becomes adjusted to a value which, together with the adjusted shutter time value yields a combination corresponding to said exposure value. In the available subsequent selection by adjustment of the shutter time adjusting member, of any desired combination of shutter time value and diaphragm value, it may happen that the diaphragm is adjusted to its smallest value or to its highest value, whereby, however, further adjustments of the shutter time value are still available. Therefore, according to a further embodiment of the invention, between the diaphragm adjusting ring and the shutter time adjusting member a coupling is provided which becomes operative only in the two end positions of the diaphragm. Due to this additional coupling, both diaphragm adjusters are then coupled with the shutter time adjusting member, so that in this case, upon further adjustment of the shutter time adjusting member, the diaphragm will be adjusted as a structural unit with the shutter time adjusting member, while maintaining the adjusted largest or smallest diaphragm opening. However, thereby the adjusted exposure value will change, because the shutter time value is modified relative to a constant diaphragm value, i.e. the smallest or largest diaphragm value.

In order to protect the operator from such erroneous adjustments, both the shutter time adjusting ring and the free diaphragm adjuster can be put, directly or indirectly, under the effect of detent members which require a noticeably stronger displacing force for simultaneous displacement. This coupling between the shutter time adjusting member and the free diaphragm adjuster is preferably formed in such a manner that the diaphragm adjusting ring is provided with an opening extending over part of a circular path, which is adapted to be engaged by a carrier pin connected with the shutter time adjusting member. Thereby, the opening should be of such length that both its lateral limiting edges will contact the carrier pin when the diaphragm is fully opened or is closed to its smallest opening, respectively.

As already mentioned above, the cam ring for controlling the follow up mark mechanism is in connection with a setting ring, which is connected with a diaphragm adjusting ring over a releasable coupling. In order to relieve this coupling, it is contemplated that the knurled rims of the diaphragm adjusting ring and said setting ring should be of equal diameter and arranged so close, side by side, that they can be gripped and displaced simultaneously.

As likewise mentioned above, the cam ring is connected over an adjustable coupling member with the setting ring. In addition to the possibility of adjustment, this has the advantage that, upon operation of the setting ring, the cam ring can be turned only, but cannot be moved otherwise, e.g. cannot be tilted or axially displaced. Thus, the mechanism of the follow up mark will be displaced always only in conformity with the pitch of the control cam, without being affected by the manner of handling. In addition, in order to impart a well-defined, fixed position to the cam ring within the objective mount body, it is of advantage to cause it by spring effect to lie tightly against a counter surface of the objective mount body.

As likewise already mentioned above, the connection between the part arranged in the objective mount and the part arranged in the camera body, of the follow up mark mechanism, is formed by a member extending in the direction of the optical axis. This member preferably consists of a control pin which is axially displaceably arranged in the objective mount body and lies against the control cam of the cam ring. With its end turned away from the control cam, this control pin lies against the part of the follow up mark mechanism located in the camera body. This part may consist of a pivoted control arm connected with a pivoted plate which, upon pivoting, causes movement of a lever carrying the follow up mark.

It has been found to be of particular advantage, if the pivotal point of the lever carrying the follow up mark is located outside the circular path described by the tip of the pointer of the exposure meter. Thereby, it is of advantage to arrange the pivotal point of the lever carrying the follow up mark in such a manner that, in both terminal positions of the exposure meter pointer, the follow up mark is in superposition with the tip of the pointer, while in intermediate positions of the pointer, the follow up mark is in superposition with points of the pointer shaft. This particular kind of arrangement of the follow up mark relative to the exposure meter pointer has the advantage that, in the initial deflection range and in the terminal deflection range of the exposure meter pointer, the follow up mark has to carry out larger displacements, relative to said pointer, than in other positions of said pivotal point.

The appended drawings illustrate by way of example some specific embodiments of and best modes for carrying out the invention, to which the invention is not limited.

Figure 1:
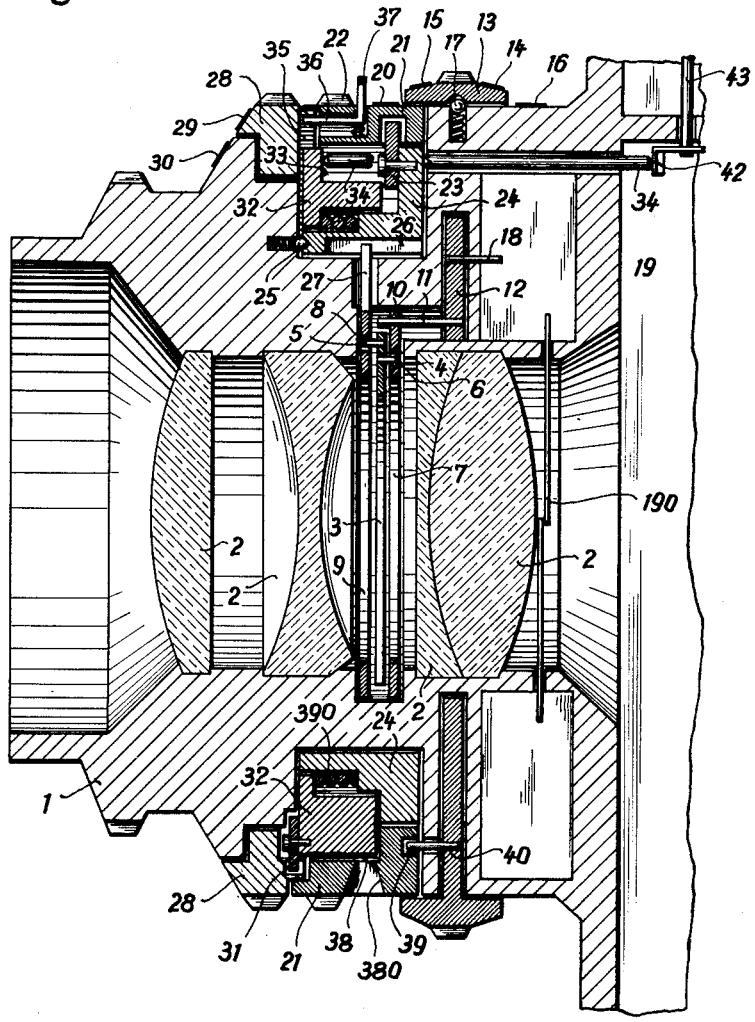
Figure 1 illustrates in side view the section through an objective mount body which contains the adjusting device according to the present invention.

Referring now to the drawings in detail, the objective mount body which contains the adjusting device according to the present invention and forms a structural unit with the casing of a central shutter, is denoted by reference numeral 1. As shown in Fig. 1, held in this body are lenses 2, which form the picture-taking objective, and an iris diaphragm is arranged between these lenses. For the sake of clarity, only one of the diaphragm lamellae is shown at 3 in Fig. 1. Seated in this lamella are a bearing pin 4 and a control pin 5. While bearing pin 4 is seated in a bearing bore 6 of a diaphragm ring 7, control pin 5 engages a control groove 8 of a diaphragm groove ring 9. Upon turning this ring 9 relative to diaphragm ring 7, diaphragm lamellae 3 are caused in conventional manner to move.

While in conventional iris diaphragms the diaphragm ring, which forms the bearing site for the lamellae, is fixedly seated in the mount body and the diaphragm groove ring which carries the control grooves is displaceable relative to the diaphragm ring, in the adjusting device according to the present invention an iris diaphragm is used, in which the diaphragm ring forming the bearing site for the lamellae can be also displaced. In such iris diaphragms which have been known by themselves, the diaphragm opening can be changed by turning the diaphragm groove ring relative to the diaphragm ring and also by turning the diaphragm ring relative to the diaphragm groove ring. Upon simultaneous rotation of both rings in the same direction, no change of the adjusted diaphragm opening occurs.

As can be seen from Fig. 1, diaphragm ring 7 is not fixedly arranged in the objective mount body 1, and is displaceable in the latter. Diaphragm ring 7 has an attached flap 10. Seated in the latter is a coupling pin 11, the other end of which engages a shutter time adjusting ring 12, having a knurled, ring-shaped adjusting handle 13. Provided on the latter are two adjusting marks 14 and 15, which can be combined into a single mark, if desired. Mark 14 cooperates with a shutter time scale 16, which is stationary in the casing. By a stop or detent device 17, shutter time adjusting ring 12 is held in each case in its adjusted position. Therefore, a certain force is required in order to adjust ring 12 to another position of adjustment. The pin 18 indicates the operative connection between shutter time adjusting ring 12 and the driving mechanism 19 for the shutter which is not shown in detail but can be carried out in conventional manner, for instance as shown and described in the U.S. Patent 2,492,723. The shutter sectors driven by mechanism 19 are denoted by 190.

Due to the fixed coupling between adjustable diaphragm ring 7 and shutter time adjusting ring 12, upon any change of the shutter time adjustment the diaphragm opening is also adjusted. Thereby, the adjusting members are turned relative to each other in such a manner that upon adjustment of the shutter time from one time value to the next which is ½ of the preceding value, e.g. from 1/30 second to 1/60 second, the diaphragm is opened by one adjusting value, e.g. from diaphragm value "11" to diaphragm value "8." Thus, the iris diaphragm is fixedly coupled with the shutter time adjusting member in the meaning of the conventional exposure value adjustment.

The diaphragm value adjusted in each case can be read at the adjusting mark 15 of shutter time adjusting ring 12, 13, because mark 15 cooperates with a diaphragm scale 20. This scale is located on a diaphragm adjusting ring 21, which is rotatably arranged in the objective mount body 1 and has a knurled rim 22. Diaphragm adjusting ring 21 is adjustably connected by a coupling member 23 with a diaphragm control ring 24. The latter is under the effect of a stop or detent device 25 which engages this ring on its front surface. A pin shaped flap 27 of diaphragm groove ring 9 engages an axially extending groove 26 of diaphragm control ring 24. Thus, the diaphragm groove ring 9 can be displaced by turning the diaphragm adjusting ring 21. Thereby the diaphragm scale 20 provided on the latter is displaced relative to mark 15 of the shutter time adjusting ring 12, 13, so that the diaphragm value adjusted in this manner can be read here too. Due to the effect of stop or detent device 25, the diaphragm value adjusted in each case can be arrested. The arresting can be subdivided so that detent sites are provided not only at the adjusting points of the diaphragm values, but also between them.

As pointed out already above, while during adjustment of the diaphragm by movement of the shutter time adjusting ring 12, 13, the exposure value, determined by the factors shutter time value and diaphragm opening, is not changed, the exposure value does change if the diaphragm is adjusted by turning the diaphragm adjusting ring 21, because in this case the shutter time adjusting ring 12, 13 is not correspondingly moved.

In the objective mount body 1 a setting ring 28 is rotatably arranged. It carries an adjusting scale 29 comprising several scale divisions and is adjustable relative to a mark 30, which is fixedly seated on objective mount body 1.

As can be seen in the lower part of Fig. 1, setting ring 28 is coupled with a cam ring 32, through an adjustable coupling member 31. Cam ring 32 is provided—as best shown in the perspective view in Fig. 2—with a control cam 33, which extends in the direction of its axis and which is engaged by a control pin 34, as shown in the upper part of Fig. 1. This control pin 34 is displaceably arranged in a direction parallel with the optical axis of the picture taking objective, in the objective mount body 1. As can be best seen in Fig. 4, it forms the connecting means between control cam 33 and a mechanism described here in more detail further below, which is arranged in the camera body, and by which the follow up mark can be adjusted to the deflection of the pointer of an electric exposure meter built-in in the camera body.

Figure 2:
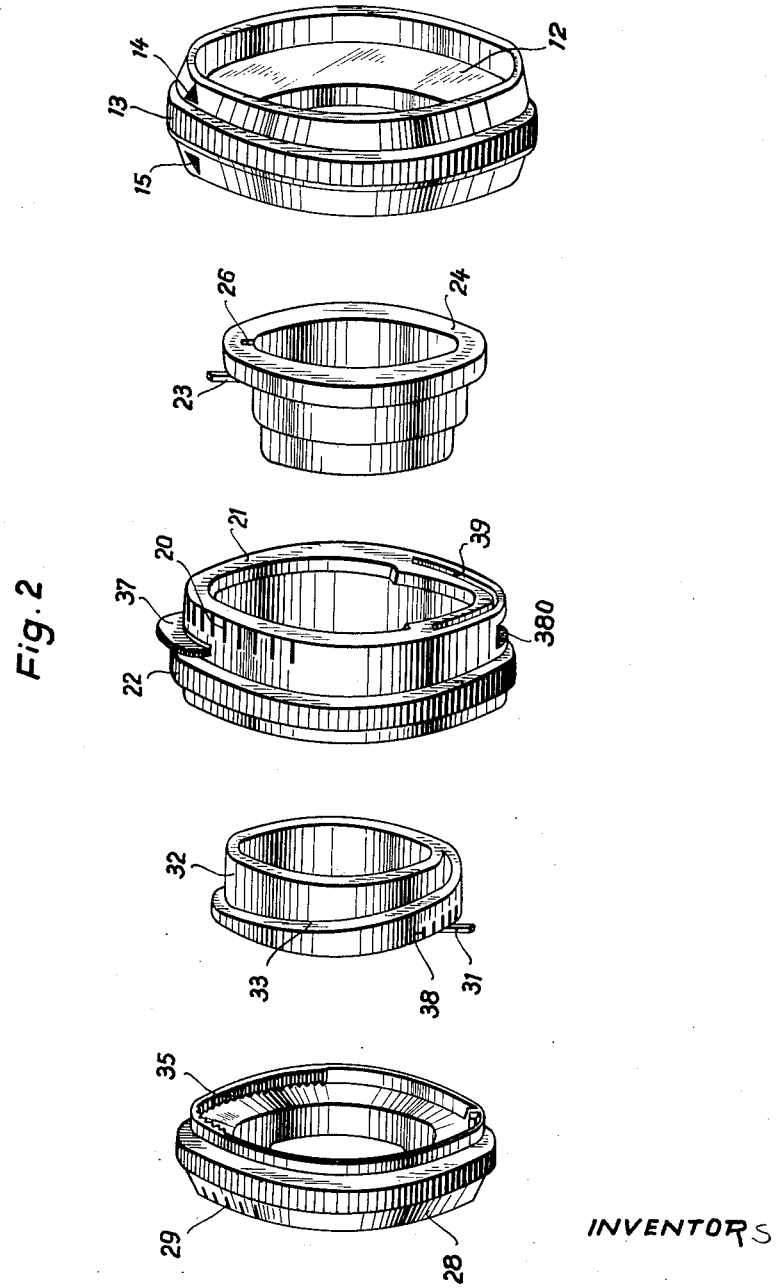
Figure 2 illustrates in perspective view some parts shown in Fig. 1.

It can be seen from the upper part of Fig. 1 and the perspective view of Fig. 2, that setting ring 28 carries a coupling internal ring gear 35, which is engaged under spring effect by a coupling arm 36 arranged in diaphragm adjusting ring 21, so that setting ring 28 and diaphragm adjusting ring 21 are coupled with each other. This coupling can be released by exerting pressure, against the spring effect, on handle 37, which projects from diaphragm adjusting ring 21, whereby coupling arm 36 is brought out of engagement with gear 35 and is held in this position. Setting ring 28 and diaphragm adjusting ring 21 can then be displaced relative to each other.

Such displacement can be carried out, for example, for adjustment to film sensitivity values. Cam ring 32, which is fixedly connected with setting ring 28, carries—as shown in the lower part of Fig. 1 and in Fig. 2—on its outer periphery enclosed by diaphragm adjusting ring 21, a scale 38 of film sensitivity values, and the sensitivity value adjusted in each case can be read in a window 380 of ring 21.

In the case of the present camera, the indicator of exposure meter 53 moves in accordance with the amount of light incident on the photoelectric cell 57 and thus shows the available light. The re-set mark 52, which is adjusted by turning setting ring 28, is moved in accordance with the particular reading of the exposure meter. Diaphragm setting ring 21 is coupled with setting ring 28, ring 21 being the exposure value setter of the camera. If the rings 21 and 28 were to be mutually coupled permanently and rigidly, then the setting of the exposure value, and hence the setting of the exposure time and diaphragm opening, would be made only in accordance with the brightness value as indicated by the exposure meter, these two settings being thus paired in a certain mannr without taking into consideration the film sensitivity value. However, in order to make it possible to take into account the film sensitivity value, rings 21 and 28 are detachably coupled with each other and with the coupling of such a nature that two rings may be adjusted with respect to each other and in accordance with a scale of film sensitivity values. The film sensitivity scale 38 is carried on the outer surface of ring 32 which is rigidly coupled with setting ring 28. The reading window or aperture 380 for scale 38 is formed in the diaphragm setting ring 21. It is of such dimensions that only the proper value of film sensitivity can be read off. The position of re-setting mark 52 can be changed with respect to the exposure value setter, ring 21, by shifting rings 21 and 28 with respect to each other.

Diaphragm adjusting ring 21 is provided, on its front surface turned toward shutter time adjusting ring 12, with a recess 39 which extends parallel to its peripheral surface, as shown in the lower part of Fig. 1 and particularly in Fig. 2. Recess 39 is engaged with play by a carrier pin 40 fixedly seated in shutter time adjusting ring 12 (see the lower part of Fig. 1). This carrier pin 40 comes in contact with diaphragm adjusting ring 21 only at the lateral limiting edges of recess 39. It forms then a coupling member between shutter time adjusting ring 12 and diaphragm adjusting ring 21, as will be described further below.

A pressure spring 390, which engages diaphragm control ring 24 on the one hand, and cam ring 32, on the other hand, holds the latter in engagement, free from play, against a counter surface of objective mount body 1, so that control pin 34, which engages control cam 33, can carry out only the axial displacement determined by the pitch of control cam 33.

It has been already mentioned above that control pin 34 forms the connecting means between control cam 33 and the mechanism which is arranged in the camera body and by which the follow up mark can be adjusted to the position of the pointer of an electric exposure meter in each case. The details of this mechanism are shown in Figs. 3 and 4.

Figure 3:
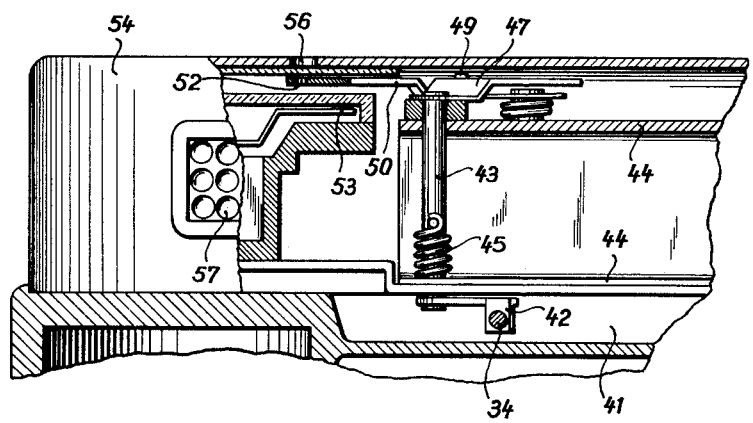
Figure 3 shows in the front view of a partly broken away camera cap, part of the follow up mark mechanism arranged in the camera cap.
Figure 4:
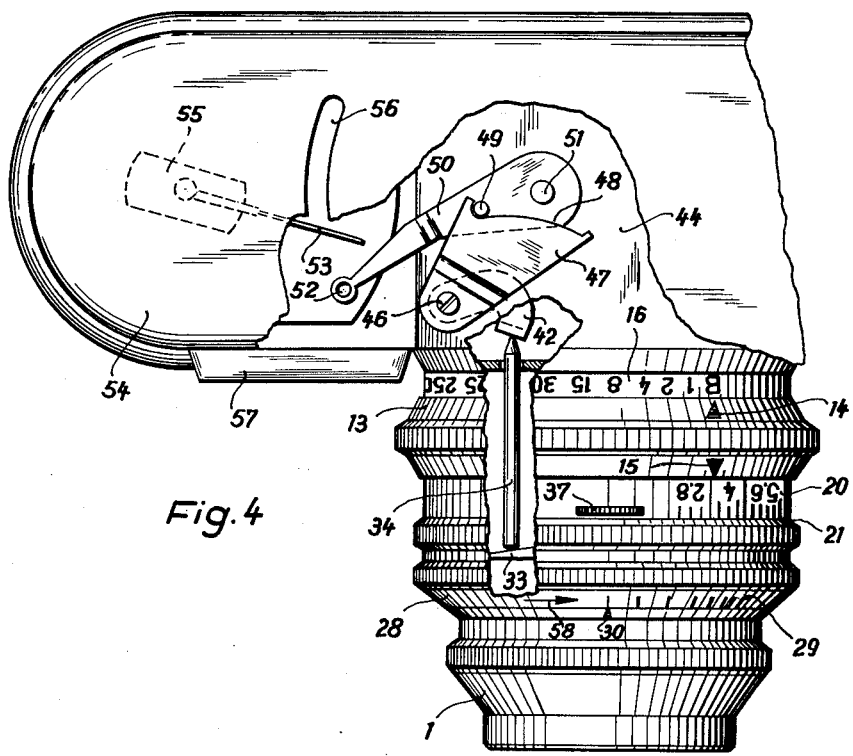
Figure 4 is the top view of a partially broken away objective mount and of a partially broken away camera provided with the mechanism according to the present invention.

Figure 4 shows that the inner end of control pin 34 projects, into camera casing 41 and engages a control arm 42, which is seated on a shaft 43. This shaft 43 has its bearings in partitions 44 of the camera casing 41 and—as shown in Fig. 3—is under the effect of a torsion spring 45. Due to the effect of spring 45, control arm 42 constantly urges control pin 34 into engagement with control cam 33. Fastened to shaft 43 by means of a screw 46 is a pivotal plate 47, the edge 48 of which (see Fig 4) is engaged by a pin 49. This pin 49 is seated in a lever 50, which is pivotally arranged about bolt 51 and is under the effect of a spring (see Fig. 3) in such a manner that pin 49 is held in permanent engagement with edge 48. The free end of lever 50 carries a follow up mark 52, which projects into the range of movement of pointer 53 of an electric exposure meter 55, which is built-in in camera cap 54. Provided in camera cap 54 is a window 56, which extends along the path of movement of follow up mark 52 and pointer 53 and mark 52 can be observed through said window 56. The light-sensitive cell for the supply of measuring current is arranged in the camera cap 54 and denoted 57.

As can be seen from Figures 3 and 4, bolt 51, about which lever 50 carrying mark 52 is pivoted, is located outside the circular path described by the tip of pointer 53 of the exposure meter. This arrangement of mark 52 relative to pointer 53 has important advantages insofar as in this manner, particularly in the terminal ranges of the deflections of pointer 53, non-linear deflections of the pointer correspond to almost linear paths of the follow-up mark 52. The latter comes to superposition with the tip of pointer 53 only in the two terminal positions of the pointer, while in intermediate positions with various points of the pointer shaft. Thus in the terminal deflection ranges of pointer 53, small pointer movements render larger movements of mark 52 necessary and the latter do not show substantial changes when the mark 52 follows larger movements of pointer 53 in the middle range of deflection.

The adjusting device described above operates in the following manner.

First, it is necessary to adjust the device to the sensitivity value of the film inserted in the camera. This is done (as already explained above) by turning—after the release of coupling 35, 36, 37—the setting ring 28 and diaphragm adjusting ring 21 relative to each other until in window 380 of ring 21 the correct film sensitivity value of scale 38 occurs. If in this adjustment only diaphragm adjusting ring 21, and thereby together with it diaphragm groove ring 9, are turned, a preliminary adjustment of the iris diaphragm, which takes into consideration the film sensitivity, results. If, however, in this adjustment only the setting ring 28 and thereby together with it cam ring 32, are turned, the result will be a corresponding preliminary adjustment of the follow up mark 52, whereby the film sensitivity is taken into consideration. Upon simultaneous turning of both rings 21 and 28 relative to each other, corresponding preliminary adjustment of the iris diaphragm and also of the follow up mark 52 will result.

After adjustment of the film sensitivity value, coupling between setting ring 28 and diaphragm adjusting ring 21 is automatically restored by releasing handle 37.

In order to take a photographic picture, the camera is held by the operator in such a manner that the light coming from the object be incident on the cell 57, whereupon the pointer 53 of the exposure meter will show a corresponding deflection. The follow-up mark 52 must then be brought to superposition with the pointer 53.

This is done by simultaneous turning of setting ring 28 and diaphragm adjusting ring 21, due to the coupling 35, 36 provided for between these two rings. In order to relieve this coupling, the knurled rims of the two rings 21 and 28 have equal designs and diameters so that they can be conveniently gripped and displaced simultaneously. Thereby, derived from setting ring 28, through coupling member 31, cam ring 32 is also moved, whereby control pin 34 is displaced. Pin 34 pivots control arm 42, whereby plate 47 and through the action of the latter lever 50 are likewise caused to move until follow up mark 52 reaches superposition with pointer 53 of the exposure meter. Simultaneously, however, from diaphragm adjusting ring 21, over diaphragm control ring 24, the diaphragm groove ring 9 and thus the iris diaphragm too have been adjusted. When mark 52 and pointer 53 are in superposition, the iris diaphragm will be adjusted to a value which—in combination with the shutter time value adjusted now—represents the exposure value corresponding to the light conditions in the respective case. Thereby it should be assumed that prior to the operation of adjusting rings 21 and 28, shutter time adjusting ring 12, 13 was incidentally adjusted to a value, which, together with the diaphragm value now adjusted, could yield the correct exposure value.

If, however, from the preceding picture taking the shutter time adjusting ring 12, 13 is adjusted e.g. to the shortest shutter time and in the contemplated picture taking, under substantially darker light conditions, this shortest shutter time does not represent the necessary exposure value even in combination with the largest diaphragm opening, then the following happens:

Upon simultaneous turning of rings 21 and 28 (which are coupled with each other) in order to cause movement of mark 52 to superposition with pointer 53, the diaphragm will be first adjusted in the direction of opening. However, upon fully opening the diaphragm, mark 52 will still not be in superposition with pointer 53. At this moment, one of the lateral limiting edges of recess 39 in diaphragm adjusting ring 21 (see lower part of Fig. 1 and Fig. 2) will come in contact with carrier pin 40 seated in shutter time adjusting ring 12, whereby a driving connection between diaphragm adjusting ring 21 and shutter time adjusting ring 12 is established. This connection acts in the present example in such a manner that upon further turning of rings 21 and 28, shutter time adjusting ring 12, 13 is likewise turned, in the direction of adjusting longer shutter times. Due to its coupling 11 with diaphragm ring 7, the latter is likewise turned, so that the fully opened iris diaphragm is turned as a total structural unit, whereby the diaphragm opening is not changed. When the follow up mark 52 comes then to superposition with pointer 53, the adjustment value of the largest diaphragm opening and the shutter time value which has been adjusted then, will constitute an exposure value which corresponds to the available light conditions, whereby the film sensitivity value has been also taken into consideration.

If this adjusted combination of diaphragm value and shutter time value does not meet the requirements for the contemplated picture taking, such combination can be changed without changing the adjusted exposure value. Thus, in the example picture taking would be possible e.g. with a shutter time which is longer than the adjusted shutter time. When, therefore, the shutter time adjusting ring 12, 13 is adjusted in the direction of longer shutter times, due to its coupling 11 with diaphragm ring 7 an adjustment corresponding to the correct exposure value, i.e. closing, of the iris diaphragm will result. Thereby, no change in the position of mark 52 will occur, because there is no movement of cam ring 32, which would cause such change. Relative to marks 14 and 15 of shutter time adjusting ring 13, the values of shutter time and diaphragm opening, adjusted in each case, can be read on scales 16 and 20.

In the above described adjustment it has been assumed that at the start of the manipulations the shutter time adjusting ring 12, 13 was adjusted to the shortest shutter time and that the latter, combined with the largest diaphragm opening, did not represent yet a combination corresponding to the exposure value to be adjusted. The adjusted position of the shutter time adjusting ring 12, 13 at the start of a new adjustment of the device is, by itself, not relevant. This is so because the length of recess 39 in diaphragm adjusting ring 21 is selected in such a manner that the rings 21 and 28 enter a coupling connection with shutter time adjusting ring 12, 13 when at the displacement of said rings the iris diaphragm is fully opened, as well as when the iris diaphragm is adjusted to its smallest value, whereby ring 12, 13 is correspondingly moved along, because either one or the other lateral edge of recess 39 comes in engagement with pin 40.

Thus, in the adjusting device of the present invention, turning of diaphragm adjusting ring 21 and of setting ring 28 coupled with it, brings about guiding of mark 52 to the deflected position of the exposure meter pointer and the simultaneous adjustment of a combination in conformity with the correct exposure value, of the diaphragm value and shutter time value, whereby the diaphragm lamellae 3 are moved from one side, i.e. from the diaphragm groove ring 9. By the subsequently available adjustment of shutter time adjusting ring 12, 13, within the previously adjusted exposure value, any other possible combination of diaphragm value and shutter time value can be adjusted, whereby the diaphragm lamellae are then moved from the other side, i.e. from diaphragm ring 7. The sensitivity value of the film material used is thereby taken into consideration.

The effect of means which are inserted into the path of rays and cause weakening of the light, e.g. the insertion of filters, can be taken into consideration by means of scale 29 provided on setting ring 28 and the mark 30 seated on mount body 1, of said scale. An adjustment of the setting ring 28 in direction of arrow 58 (see Fig. 4) provided thereon, from one division of scale 29 to the other, corresponds to a consideration of the lengthening factor "1." Thus, if in taking a photographic picture a filter having a lengthening factor "2" is used, then—after the follow up mark 52 has been brought to superposition with pointer 53 in the above described manner—setting ring 28 and diaphragm adjusting ring 21 coupled therewith, must be additionally displaced in the direction of arrow 58 by two scale divisions of scale 29. By this adjustment, the iris diaphragm will be correspondingly opened by ring 9. In this manner a particular combination of diaphragm value and shutter time value is adjusted, which corresponds to the exposure value corresponding to the deflection of pointer 53, modified by the lengthening factor "2." Then a combination of diaphragm value and shutter time value, which is suitable for picture taking, can be selected in the manner described, by corresponding adjustment of shutter time adjusting ring 12, 13, without change of the adjusted exposure value which has been modified by the lengthening factor "2."

In such adjustment of the lengthening factors, the follow up mark 52, which was previously in superposition with pointer 53, is displaced again, because upon turning rings 21 and 28 for adjustment of scale 29, the cam ring 32 also moved. Thus, although during this picture taking, follow up mark 52 and pointer 53 are not in superposition, the adjusted values of diaphragm and shutter time correctly correspond to the picture taking conditions.

Adjustment of the rings 21 and 28, carried out for consideration of the lengthening factors, is automatically cancelled upon subsequent displacement of these rings, when follow up mark 52 is brought again to superposition with pointer 53.

After each adjustment of the exposure value, in selecting the diaphragm value and shutter time value by turning the shutter time adjusting ring 12, 13, it may happen that during this adjustment the iris diaphragm reaches its largest or smallest adjusting value. It is true that movement of mark 15 along the diaphragm scale 20 permits observations of the adjusted diaphragm value in each case. However, it can be overlooked that one of the two terminal positions of the iris diaphragm has been reached. In such a case, pin 40 (see lower part of Fig. 1) fixedly seated in the shutter time adjusting ring comes in engagement with one of the two lateral limiting edges of recess 39 in diaphragm adjusting ring 21. As the latter is firmly connected with diaphragm control ring 24, which is under the effect of stop device 25, an attempt of further turning shutter time adjusting ring 12, 13, will be met by a noticeably stronger resistance. Such resistance indicates to the operator that the iris diaphragm has reached an end position.

In itself, upon reaching one of the end positions of the iris diaphragm, by further turning the shutter time adjusting ring 12, 13, over-all displacement of the diaphragm, which is fully opened or closed to its smallest value, would be possible, because pin 40 takes then along rings 21 and 24, which are connected with ring 9. Thereby, however, at constant diaphragm adjustment, only the shutter time value would be changed, so that the adjusted exposure value would be modified. However, the noticeably stronger resistance to adjustment, of the shutter time adjusting ring 12, 13, represents a warning from such inadvertent defective adjustment.

As all necessary adjustments have thus been made, the shutter can be released.

In the above described example, two reading marks 14, 15 are provided on shutter time adjusting ring 12, 13. These two marks can be united to a single mark, e.g. a marking line, the ends of which cooperate with scales 16 and 20, respectively. It is, of course, also possible to arrange the shutter time scale and the diaphragm scale on ring 12, 13 and arrange the reading marks on the objective mount body and the diaphragm adjusting ring 21, respectively.

It will be understood from the above that this invention is not limited to the specific designs, constructions, arrangements, members and other details specifically described above and illustrated in the drawings and can be carried out with various modifications without departing from the scope of the invention as defined in the appended claims.

What is claimed is:

1. In a still photographic camera having an objective, a shutter, a bladed iris diaphragm, and an exposure meter built into the body of the camera: the combination comprising a first diaphragm mounting ring mounted for angular displacement coaxially of the optical axis of the objective; a shutter speed setting ring mounted for angular displacement coaxially with said diaphragm ring; means coupling said rings for conjoint rotation; a second diaphragm mounting ring mounted for angular displacement coaxially with said first diaphragm ring and formed with a groove facing the latter; the iris diaphragm blades each having a pair of oppositely projecting radially spaced pins respectively engaged in holes in said first diaphragm ring and the groove in said second diaphragm ring; a diaphragm setting ring mounted for angular displacement coaxially with said second diaphragm mounting ring and coupled for rotation therewith; a further setting ring mounted for angular displacement in the objective about the optical axis thereof; a disengageable coupling interconnecting said diaphragm setting ring and said further setting ring whereby the latter may be displaced relative to said diaphragm setting ring with relation to a film sensitivity scale; a cam ring mounted for angular adjustment about the optical axis and having a cam surface facing the camera body; means adjustably coupling said cam ring to said further setting ring; a relatively elongated feeler pin mounted for movement parallel to the optical axis and having its outer end engaging said cam surface; and mechanism in the camera body including a component engaging in the inner end of said pin and operating a follow-up index arm movable into registry with a movable indicator incorporated in said exposure meter.

2. The combination claimed in claim 1 in which the diaphragm setting ring has a coaxial arcuate cutout having a length corresponding to the angle of oscillation of the diaphragm setting ring between the limiting positions of the diaphragm; said shutter speed setting ring having a fixed pin engaged in said cutout.

3. The combination claimed in claim 1 including a spring biasing said cam ring continuously against a fixed surface of the objective.

References Cited in the file of this patent

UNITED STATES PATENTS

| 2,467,946 | Rossmann et al. | Apr. 19, 1949 |
| 2,849,936 | Fahlenberg | Sept. 2, 1958 |

FOREIGN PATENTS

| 756,282 | Germany | Feb. 23, 1953 |